US005376777A

United States Patent [19]

Kamei et al.

[11] Patent Number: 5,376,777

[45] Date of Patent: Dec. 27, 1994

[54] CONTROL APPARATUS AND METHOD FOR A SUBSTRATE TRAY ON AN IN-LINE SPUTTERING APPARATUS

[75] Inventors: Mitsuhiro Kamei; Eiji Setoyama, both of Hitachi, Japan

[73] Assignee: Hitachi, Ltd., Tokyo, Japan

[21] Appl. No.: 795,732

[22] Filed: Nov. 21, 1991

[30] Foreign Application Priority Data

Nov. 21, 1990 [JP] Japan .................................. 2-316664

[51] Int. Cl.5 ........................ G06F 15/20; G07B 15/02

[52] U.S. Cl. ...................................... 235/375; 235/384

[58] Field of Search ............................ 377/15, 16, 6, 8; 235/375, 385, 454, 462, 475, 384; 414/287, 416; 361/413

[56] References Cited

U.S. PATENT DOCUMENTS

| | | | |
|---|---|---|---|
| 4,042,128 | 8/1977 | Shrader | 414/287 |
| 4,514,130 | 4/1985 | Gladish | 414/416 |
| 4,717,026 | 1/1988 | Fischer et al. | 377/6 |
| 4,987,516 | 1/1991 | Belanger, Jr. et al. | 361/413 |
| 5,041,721 | 8/1991 | Smith et al. | 235/462 |
| 5,117,096 | 5/1992 | Bauer et al. | 235/462 |
| 5,128,519 | 7/1992 | Tokuda | 235/462 |

*Primary Examiner*—Timothy P. Callahan
*Assistant Examiner*—Trong Phan
*Attorney, Agent, or Firm*—Antonelli, Terry, Stout & Kraus

[57] ABSTRACT

The number of times a substrate tray has been used and the amount of distortion of the substrate tray are measured. When the number of times of use or the distortion amount of the substrate tray exceed a predetermined value, respectively, the substrate tray is exchanged automatically.

10 Claims, 5 Drawing Sheets

CONTROL APPARATUS AND METHOD FOR A SUBSTRATE TRAY ON AN IN-LINE SPUTTERING APPARATUS

FIELD OF THE INVENTION

The present invention relates to a control method and apparatus for a substrate tray which is used repeatedly. More specifically, the present invention relates to a control method and apparatus for a substrate tray which is used in an in-line type sputtering apparatus.

BACKGROUND OF THE INVENTION

Uses for a sputtering apparatus and a chemical vapor deposition (CVD) apparatus have increased in many fields as a thin film producing means for many kinds of materials. Specifically, substrates are successively processed by connecting a sputtering chamber for substrates, a loading chamber for the substrates, a heating chamber for the substrates, and an etching chamber and a removal chamber for the substrates for the purposes of increasing and stabilizing film characteristics of sputtered films in a mass production apparatus.

Each chamber of such apparatus is partitioned by a gate valve and usually is maintained in a vacuum condition without being opened to the air except for the loading chamber and the removal chamber.

The substrates are transferred one by one by a transfer means provided within the apparatus when the substrates are processed using the above-mentioned in-line type apparatus.

In such a case, the substrates are not transferred independently, but are transferred by being mounted on carriers, so-called trays or pallets (hereunder, substrate trays or trays).

The trays are transferred within the apparatus, and particular processes take place on the trays, after the substrates are set on the trays by an operator or robot outside of the apparatus. After the processes are finished, the operator or robot removes the substrates from the trays. After that, new substrates are set on the trays to permit performing the processes repeatedly.

The substrate trays are used repeatedly as mentioned above.

If the substrate trays happen not to be transferred perfectly, the production of the substrates is delayed, and trouble occurs in the frequency of transferring during the repeated usage of the substrate trays. The main reason for these troubles is thought to be distortion of the trays which is caused by thermal hysteresis due to heating during the sputtering of the substrates. When films fixed to the trays come off during the sputtering, the films are mixed with the sputtered films as dust, causing faulty products. To avoid this trouble, it is necessary to wash the trays.

Conventionally, operators have checked numbers provided on the trays, supervised the number of times of use of the trays, and exchanged and washed the trays after a predetermined number of times of use. Conventional automatic tray transfer line assembling apparatus has been proposed to provide a space for exchanging the trays other than at the substrate release portion. However, the apparatus has not provided a device for supervising the trays automatically.

In case of vertical type transferring of the substrate trays, when the substrates are set automatically using a robot, the trays are usually set in the state of vertical standing. Accordingly, this kind of apparatus does not necessitate a mechanism for laying the trays vertically or horizontally.

However, when the substrates are installed vertically, the substrates sometimes fall from the apparatus erroneously. The reason for this is that the structure of the vertical type tray is such that the thin substrate, having a thickness in the order of several mm, is set to a wide groove having a slightly large width compared with that of the thickness of the substrate.

To avoid this drawback, a method is proposed in which an inclination of the tray is calculated by a sensor provided on a hand of the robot, and automatic installation of the substrate is carried out accurately, as disclosed in FIG. 5 of the Japanese Patent Laid-Open No. 62-230973 entitled "Disc moving and mounting method of sputtering apparatus," published on Oct. 9, 1987.

Since the prior art mentioned above does not disclose an automatic supervising method relating to the repeated use and the amount of distortion of the tray, there remains a problem that difficulty in transferring the tray may arise on account of a delay in exchanging the tray, or a large stress or strain of the tray may occur, even when the tray is exchanged within a predetermined number of times of use.

When the trouble occurs with the apparatus, the processing chambers have to be opened to the air to permit overcoming the trouble. This considerably lowers the operation rate because of the start up time for the apparatus, and causes unstable film characteristics.

Since the above-mentioned Japanese Patent Laid-Open No. 62-230973 does not concern the strain of the whole trays, trouble occurs in the installation of the substrates when the trays are deformed.

SUMMARY OF THE INVENTION

An object of the present invention is to provide a transfer apparatus for a substrate which is able to control automatically a substrate tray, prevent it from causing trouble during transferring the substrate tray, and increase operation rate and reliability of the apparatus.

Another object of the present invention is to reduce misinstallation of the transfer apparatus when the substrate tray is installed in the apparatus.

The first object of the present invention can be attained by a control apparatus for the substrate tray comprising:

(a) a tray identification means for reading out a number of identification marks which are provided on a substrate tray and capable of reading out optically and identifying whether the substrate tray is a tray which has been previously used;

(b) a deformation measuring means for detecting a distance between said substrate tray and a standard position thereof and measuring a deformation amount of said tray;

(c) a counting means for counting the number of times said tray having said identification marks has been used;

(d) a comparing means for comparing said deformation amount and a previously set deformation amount; and (e) an output means for outputting a signal when the number of times of use of said tray has reached a previously set number of time or when said deformation amount exceeds a previously set deformation amount.

The second object of the present invention can be attained by a control method for the substrate tray comprising:

(a) a step of reading out an identification number provided on a substrate tray and supervising the number of times of use of the tray;

(b) a step of measuring a deformation amount for said tray; and (c) a step of removing said tray from a transfer line when said number of times of use exceeds a predetermined number of times and/or said deformation amount exceeds a predetermined allowable deformation amount.

The second object also can be attained by an output means which indicates the that substrate tray has reached a predetermined number of times of use or deformation amount.

The apparatus of the present invention is operated as follows:

An identification number, which is able to be read out automatically by an identification means such as a displacement sensor, a photoelectronic switch or a bar code reader, is provided on a substrate tray.

Addresses in a memory device in a sequencer or a personal computer are designated corresponding to the identification number of the tray.

Next, the identification number is read out automatically by the identification means and identified. The number of times of use of the tray is determined from the read number. Whether the number of times of use of the tray exceeds a predetermined number of times is determined automatically.

Automatic processing with software takes place so as to add one to a counter of the address corresponding to the identification number each time the trays is used for supervising the number of times of use of the tray by this counting.

Whether the number of times of use exceeds a predetermined number of times is always determined. When the number of times of use exceeds the predetermined number of times, this is indicated by an alarm, or an automatic exchanging mechanism exchanges the tray automatically.

As a result, an exchange miss, which may occur in the supervising by an operator, can be prevented perfectly, and the exchange after the predetermined number of times can be performed for every tray.

The amount of distortion of the substrate tray can be measured by measuring at least four distances between basic positions of displacement sensors and the surface of the tray. When the distortion amount exceeds a predetermined value, an alarm is activated or an automatic exchange mechanism exchanges the tray having the distortion which exceeds the predetermined amount for a new tray having no distortion. By adopting the automatic exchange mechanism, trouble in transferring the tray caused by the distortion of the tray, which cannot be prevented by only supervising the number of times of use of the tray, can be prevented before it occurs.

When the substrate tray is installed automatically using a robot, the apparatus calculates the distortion amount, and the position of the substrate to be installed on the substrate tray can be compensated by the robot corresponding to the distortion amount, even if the distortion amount is lower than the predetermined value. As a result, the likelihood of an installation miss in the substrate being installed on the tray can be considerably decreased.

DETAILED DESCRIPTION OF THE PREFERRED EMBODIMENTS

Figure 1A:
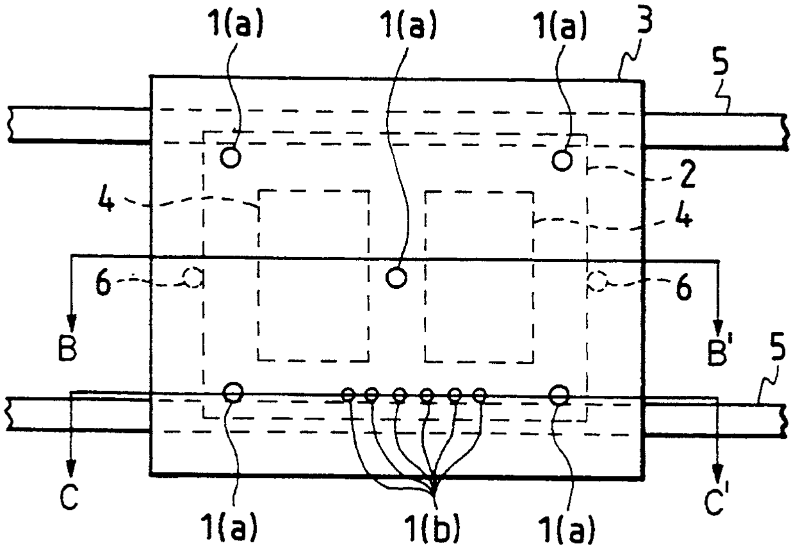
FIG. 1A illustrates a front view of a transfer apparatus of one embodiment of the present invention.
Figure 1B:
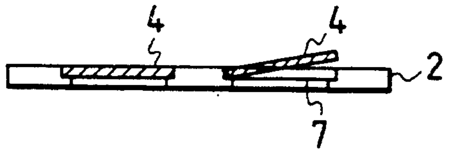
FIG. 1B shows a sectional view along B—B' line shown in FIG. 1A in which one substrate overhangs a substrate tray.
Figure 1C:
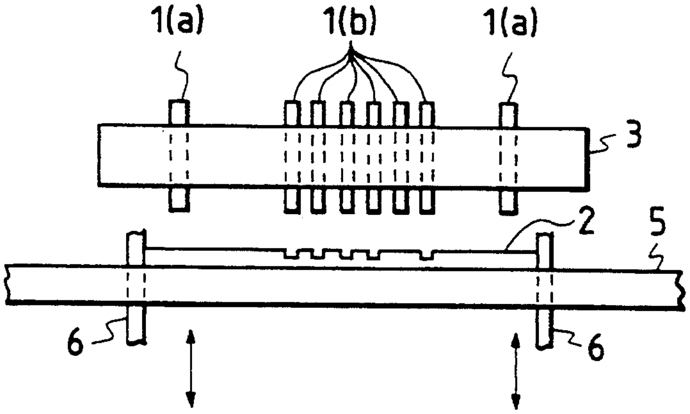
FIG. 1C shows a sectional view along C—C' line shown in FIG. 1A.
Figure 1D:
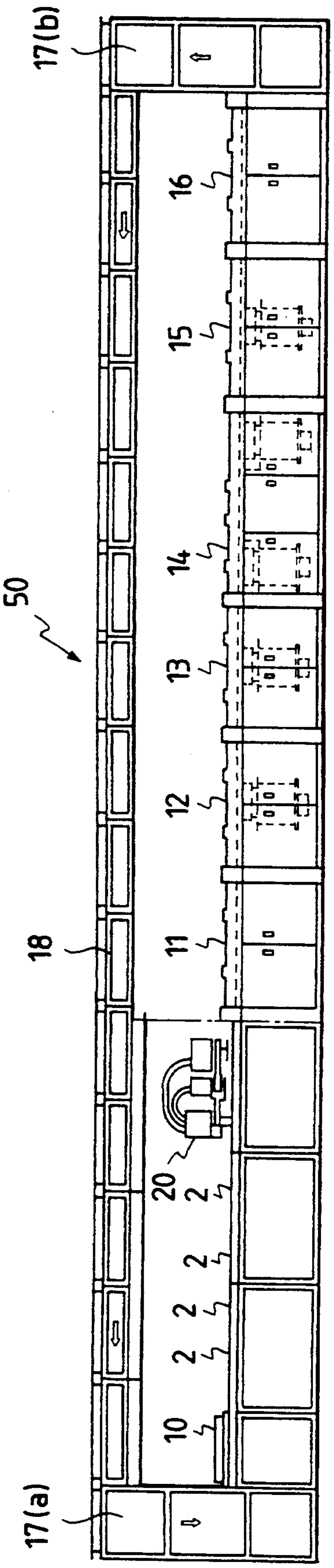
FIG. 1D shows a side view of an in-line sputtering apparatus to which the apparatus of the present invention is applied.

Referring to FIG. 1D, the in-line sputtering apparatus 50 comprises a loading chamber 11, a heating chamber 12, an intermediate chamber 13 for extracting out gas generated from the heating chamber 12 and carrying out an operation of transferring the substrate tray 2 successively in a sputtering chamber 14 next to the intermediate chamber 13, the sputtering chamber 14, a cooling chamber 15, a draw-out chamber 16 and a robot 20 for installing the substrates.

The substrates 4 (FIGS. 1A and 1B) are installed on the substrate tray 2 by the robot 20, and the substrate tray 2 is transferred from the loading chamber 11 to each chamber in order so that the substrates 4 are treated by various kinds of processes.

After the processes of the substrates are finished, the substrate tray 2 is transferred from the draw-out chamber 16 and is raised by an elevator 17(*b*), conveyed by a tray return 18, lowered by another elevator 17(*a*), and returned to the original place.

The robot 20 removes the processed substrate from the returned substrate tray 2 and installs a new substrate 4 on the substrate tray 2.

After that, the substrate tray 2 is transferred to the loading chamber 11, and the same processes are repeated to the new substrate. In this manner, the substrate tray 2 is used repeatedly.

In the embodiment, a substrate tray supervising device 10, comprising an identification means for identifying an identification number provided on the tray and a deformation amount measuring means for measuring the deformation amount of the tray, is provided at the end of the tray lowering elevator 17(*a*).

Hereunder, we will explain the detail of the substrate and the tray supervising device 10, referring to FIGS. 1A, 1B and 1C.

Two sheets of substrates 4 are installed on the substrate tray 2. The transferred substrate tray 2 is positioned accurately by substrate tray positioning pins 6 which are movable up and down. Upon the substrate tray 2, in the position in which the substrate tray 2 is positioned by the pins 6, there is a plate 3 which holds displacement sensors 1(*a*) and 1(*b*).

The distance between the basic position, which faces the substrate tray 2 at the top end of the sensors 1(*a*), and the surface of the substrate tray 2 is measured by five sets of displacement sensors 1(*a*).

The measuring value of each displacement sensor is adjusted ahead of time so as to be equal, when there is no distortion of the substrate tray 2. The distortion amount of the substrate tray can be measured based on the measured distances from the five sets of sensors.

Figure 2A:
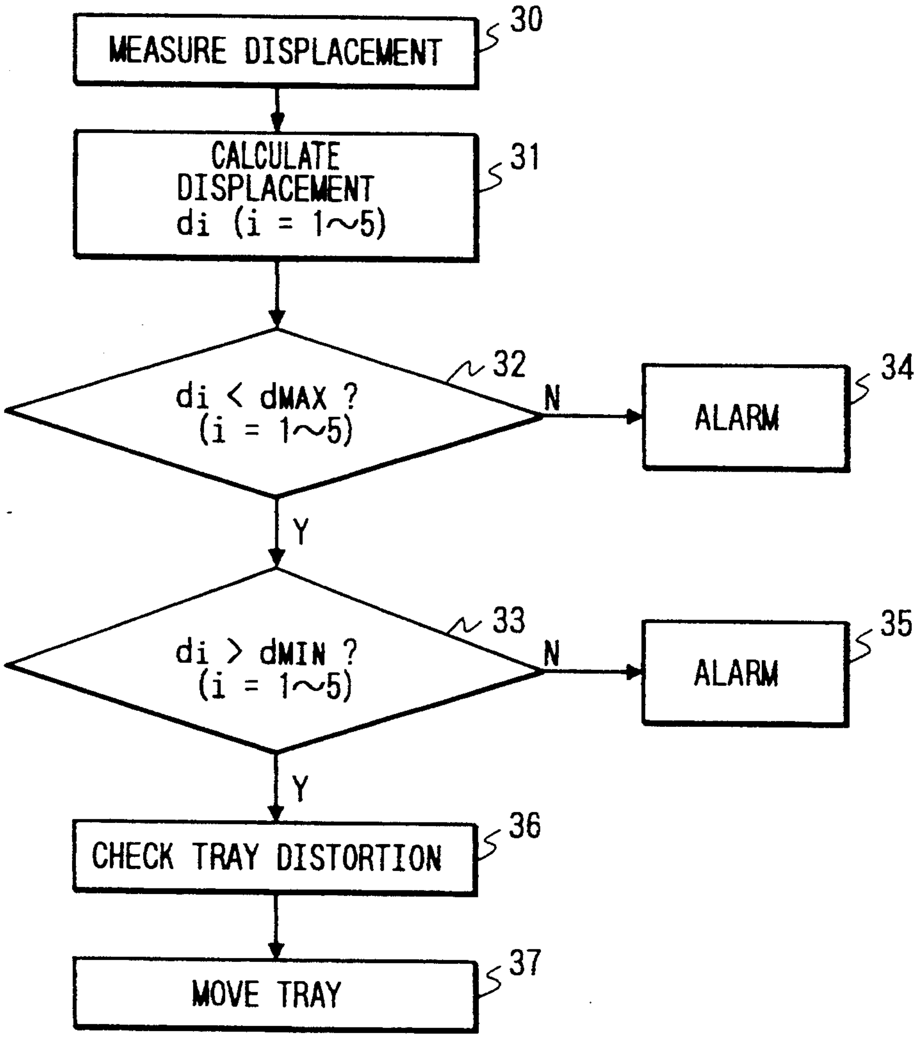
FIG. 2A shows a flow chart for determining the distortion of a substrate tray.

Referring to FIG. 2A, the displacement amount of the substrate tray is measured at step 30. The displacement amount di is calculated at step 31. Whether the displacement amount is lower than the upper limit dMAX of the allowable range of the displacement amount of the measured tray is determined at step 32. When the displacement amount exceeds the upper limit, an alarm is indicated at step 34. When the displacement amount does not exceed the upper limit, it is determined whether it is lower than the limit dMIN at step 33.

When the displacement amount is lower than the lower limit, an alarm is indicated at step 35.

Whether the distortion amount of the tray is within the allowable range is checked at step 36. When the distortion amount is within the allowable range, the tray is used again at step 37.

As a concrete example of determining the tray displacement amount in the above-mentioned flow chart, the following two methods are considered. One method is that the sensors have the function of introducing the distortion amounts and determining the distortion amount, the other method is that the displacement amounts are detected by the sensors as analog data and compared with other analog data.

Referring to FIG. 1B, the substrate tray 2 has two through holes 7 having steps for mounting the substrates 4 thereon, respectively. Suppose that the distortion is generated near the right through hole 7 of the substrate tray 2, and the right substrate 4 overhangs the substrate tray 2, as shown in FIG. 1B. The distortion can be detected by the displacement sensors 1(*a*). The robot controls operation to mount the right substrate on the right hole correctly.

Hereunder, we will explain the method of determining the number of times of use of the substrate tray 2.

Referring to FIGS. 1A and 1C, six sets of displacement sensors 1(*b*) are mounted on a displacement sensor holding plate 3 and read out grooves provided previously on the substrate tray 2.

The grooves on the tray form bits of a binary number. For instance, 1 is denoted by the substrate having a groove, and 0 is denoted by the substrate having no groove. In the embodiment depicted in FIG. 1C, the number of the substrate tray is $1\times2^0+0\times2^1+1\times2^2+1\times2^3+1\times2^4+1\times2^5=61$. Since the displacement sensors 1(*b*) have accuracy of several numbers of 10 $\mu$m, whether there is any groove or not can be detected accurately.

Necessary figures are decided according to the numbers of trays used. By reading out the identification number, the number of times of use of the tray can be determined.

Figure 2B:
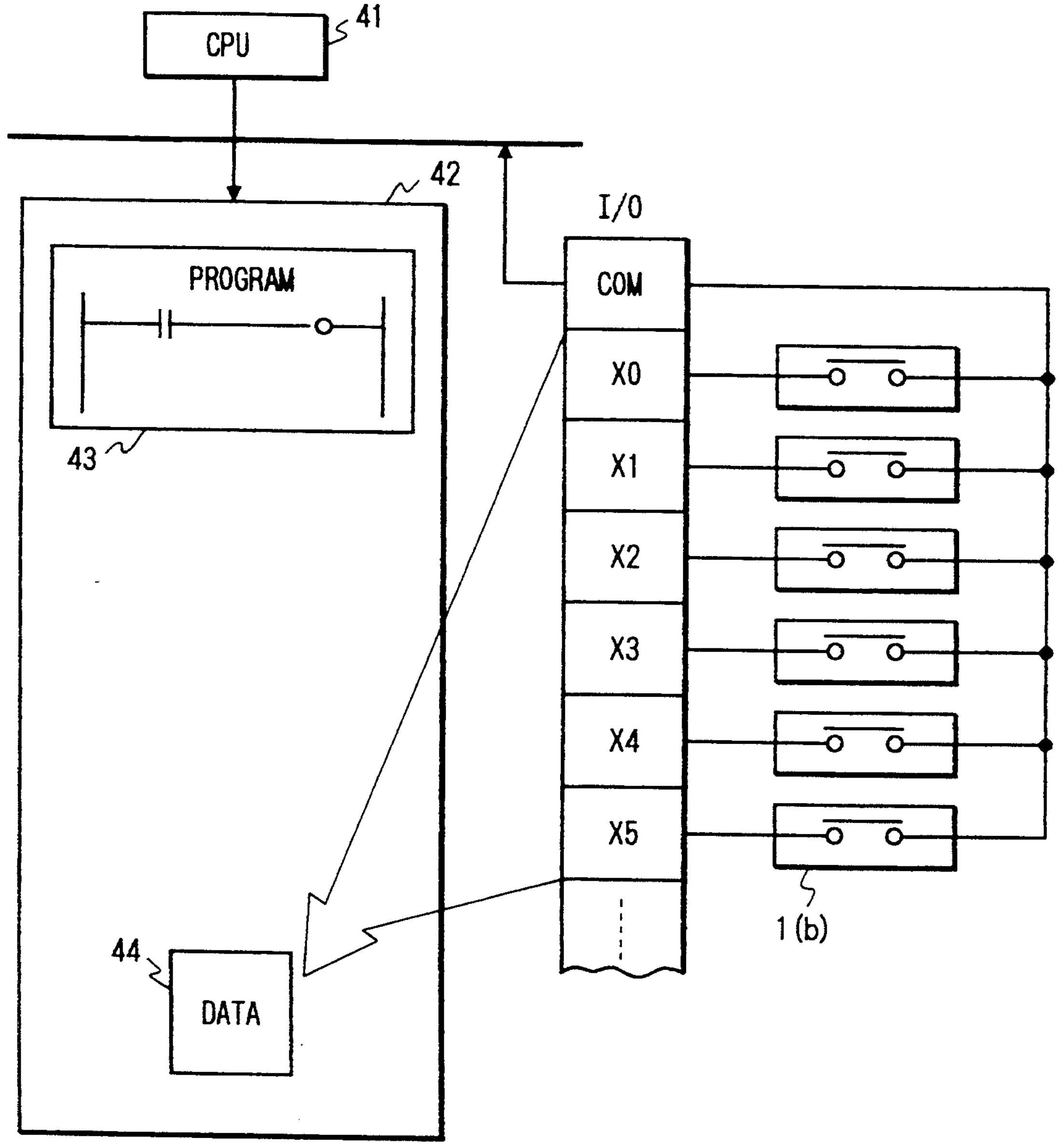
FIG. 2B shows a diagram useful in explaining the determination of the number of times of use of the tray.

Referring to FIG. 2B, the apparatus for determining the number of times of use of the substrate tray 2 comprises the displacement sensors 1(*b*) for determining the numbers of the trays, a memory 42 for storing the number of times of use of the trays, and a CPU 41 for determining whether the number of times of use of the tray exceeds the predetermined number of times. The memory 42 stores a program 43 for the determining, and an input module 44 for receiving data of the number of times of use of the substrate trays.

Figure 2C:
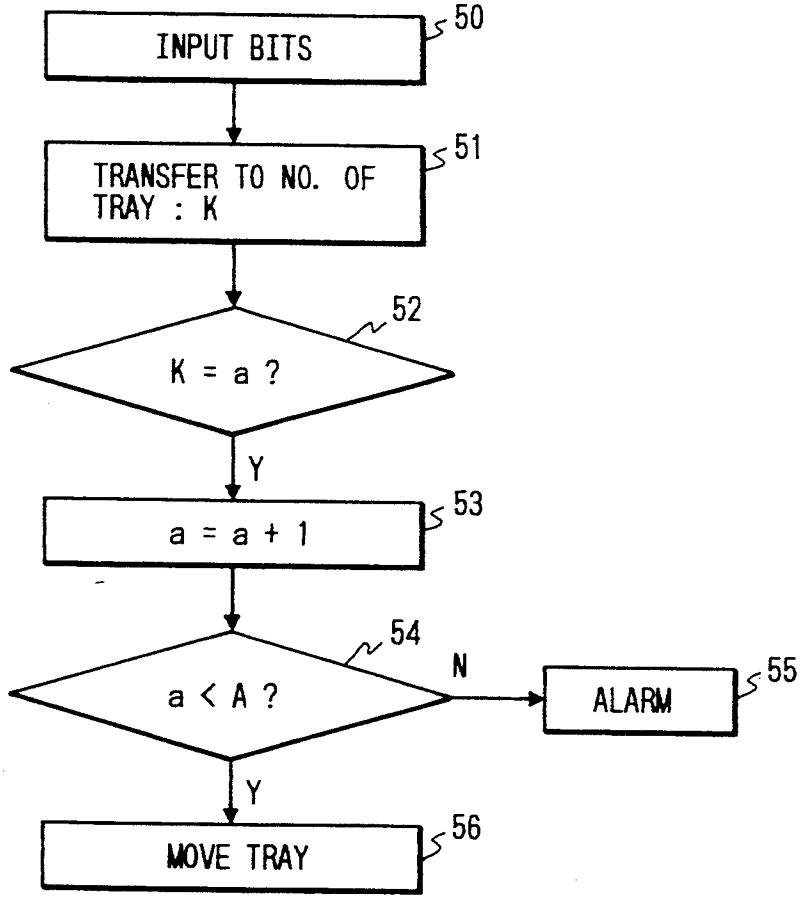
FIG. 2C shows a flow chart for determining the number of times of use of the tray.

Hereunder, we will explain the method of determining the number of times of use of the trays, referring to FIGS. 2B and 2C.

The displacement signal, indicating whether there is a groove or not, from each sensor 1(*b*) is inputted to the input module 44 of the sequencer through an I/O unit according to the program 43 at step 50. The inputted signal is converted to the number of the tray at step 51. A signal a of the number of times of use of the tray corresponding to the identification number K is read out by the CPU 41 within the sequencer step 52. One is added to the number a at step 53. The number a is compared with the predetermined number of times A at step 54. When the tray is used more than the predetermined number of times A, an alarm is initiated at step 55. When the tray is not used more than the number of times A, the tray is moved again at step 56.

The present embodiment discloses that the grooves are used as the identification number of the substrate tray 2. The identification number can be also detected in such a manner as determining whether there are any through holes in the substrate tray or not and may be detected by photoelectric switches instead.

Figure 3:
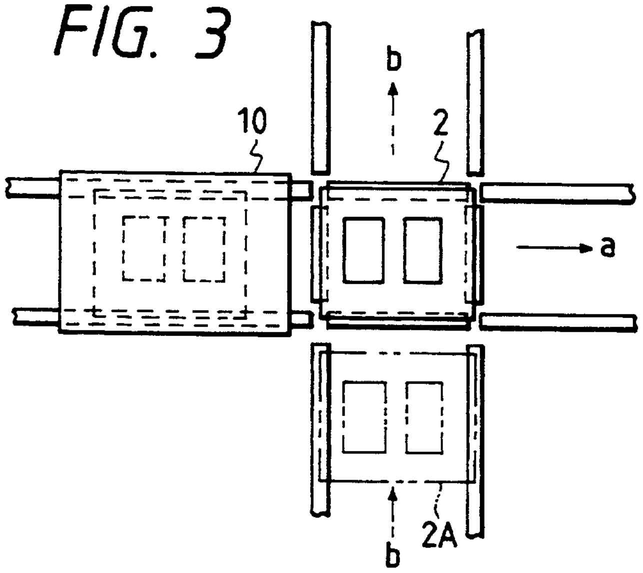
FIG. 3 illustrates a front view of an automatic exchange mechanism of the tray which is applied to the apparatus of the present invention.

The embodiment shows that a large distortion amount is indicated by an alarm. However, the present invention is not limited to that embodiment. Namely, the present invention includes the system shown in FIG. 3. In FIG. 3, a transfer mechanism, which is at right angle to the normal transfer mechanism a is provided next to the substrate tray supervising mechanism 10. The substrate tray supervising mechanism 10 transfers the substrate tray 2 in the direction b by controlling the transfer system when the deformation amount of the substrate tray 2 exceeds the predetermined amount or the substrate tray 2 is determined to have been used a number of times exceeding the predetermined number of times and exchanges automatically the tray for a new one. Incidentally, the substrate tray 2 is taken to a place for processes of cleaning or remedying the distortion after the substrate is collected.

According to the embodiment, the tray is controlled automatically on the basis of the number of times of use and the deformation amount so that the problems caused by not exchanging trays and deformation of the trays can be prevented.

Further, the apparatus of this embodiment can prevent non-uniformity of the film thickness caused by the deformation of the trays. The embodiment is explained in the case of the tray being transferred horizontally. However, the embodiment of the present invention can be applied to a tray which is transferred vertically.

When the substrate is installed by a vertical type transfer robot, trouble in the installation of the substrates can be reduced considerably by calculating the distortion amount of the substrate tray and feeding back the distortion amount to the robot.

The embodiment is explained in that the apparatus is applied to an in-line sputtering apparatus. The present invention is not limited to sputtering apparatus, but may be applied to all apparatus which use a substrate tray.

According to the present invention, the control of the substrate tray is carried out automatically, and the problems in transferring thereof can be reduced widely so that the present invention can attain the following effects.

(1) The tray does not need to be controlled by an operator, so that the productivity of the tray is improved remarkably.

(2) Stop time of the apparatus caused by trouble in transferring the tray is reduced, so that the operation rate of the apparatus is increased significantly.

(3) Since the number of times the vacuum chamber is opened to the air due to trouble in transferring are decreased, the characteristics and stability of the film are improved.

The trouble in the installation of the substrate is decreased by feedback of the distortion amount of the tray to the substrate installation robot so that the reliability of the apparatus is improved considerably.

What we claim is:

1. A control apparatus for a substrate tray, said control apparatus comprising:

identification means for detecting an identification number of a substrate tray;

count means responsive to the detected identification number for counting the number of times the substrate tray has been used; and output means for outputting a signal indicating that the counted number has reached a predetermined number.

2. A control apparatus for a substrate tray, said control apparatus comprising:

deformation measuring means for detecting a deformation between an identification mark position which is provided on a substrate tray and a standard position thereof and for measuring a deformation amount of the substrate tray;

comparison means for comparing the measured deformation amount and a previously set deformation amount; and output means for outputting a signal when the measured deformation amount exceeds the previously set deformation amount.

3. A control apparatus for a substrate tray, said control apparatus comprising:

tray identification means for reading out a number of identification marks which are provided on a substrate tray;

deformation measuring means for detecting a distance between the substrate tray and a standard position thereof and for measuring a deformation amount of the substrate tray;

counting means responsive to the read out number of identification marks for counting the number of times the substrate tray has been used;

comparing means for comparing the measured deformation amount and a previously set deformation amount: and output means for outputting a signal when the counted number has reached a previously set number or when the measured deformation amount exceeds the previously set deformation amount.

4. A transfer apparatus for a substrate tray, said transfer apparatus comprising:

identification means for detecting an identification number of a substrate tray;

count means responsive to the detected identification number for counting the number of times the substrate tray has been used;

output means for outputting a signal indicating that the counted number has reached a predetermined number;

stock means for stocking a number of available substrate trays; and tray exchange means responsive to the output signal for exchanging the substrate tray for an available substrate tray.

5. A transfer apparatus for a substrate tray, said transfer apparatus comprising:

deformation measuring means for detecting a deformation between an identification mark position which is provided on a substrate tray and a standard position thereof and for measuring a deformation amount of the substrate tray;

comparison means for comparing the measured deformation amount and a previously set deformation amount;

output means for outputting a signal when the measured deformation amount exceeds the previously set deformation amount;

stock means for stocking a number of available substrate trays; and tray exchange means responsive to the output signal for exchanging the substrate tray for an available substrate tray.

6. A transfer apparatus for a substrate tray, said transfer apparatus comprising:

tray identification means for reading out a number of identification marks which are provided on a substrate tray;

deformation measuring means for detecting a distance between the substrate tray and a standard position thereof and for measuring a deformation amount of the substrate tray;

counting means responsive to the read out number of identification marks for counting the number of times the substrate tray has been used;

comparing means for comparing the measured deformation amount and a previously set deformation amount;

output means for outputting a signal when the counted number has reached a previously set number or when the measured deformation amount exceeds the previously set deformation amount;

stock means for stocking a number of available substrate trays; and tray exchange means responsive to the output signal for exchanging the substrate tray for an available substrate tray.

7. An in-line sputtering apparatus, comprising:

a plurality of chambers for performing a sputtering process on a substrate passing through said plurality of chambers, on a substrate tray;

identification means for detecting an identification number of a substrate tray on which a substrate is passed through said plurality of chambers;

count means responsive to the detected identification number for counting the number of times the substrate tray has passed through said plurality of substrates;

output means for outputting a signal indicating that the counted number has reached a predetermined number;

stock means for stocking a number of available substrate trays; and tray exchange means responsive to the output signal for exchanging the substrate tray for an available substrate tray.

8. An in-line sputtering apparatus, comprising:

a plurality of chambers for performing a sputtering process on a substrate passing through said plurality of chambers on a substrate tray;

deformation measuring means for detecting a deformation between an identification mark position which is provided on a substrate tray passing through said plurality of chambers and a standard position thereof and for measuring a deformation amount of the substrate tray;

comparison means for comparing the measured deformation amount and a previously set deformation amount;

output means for outputting a signal when the measured deformation amount exceeds the previously set deformation amount;

stock means for stocking a number of available substrate trays; and tray exchange means responsive to the output signal for exchanging the substrate tray for an available substrate tray.

9. An in-line sputtering apparatus, comprising:

a plurality of chambers for performing a sputtering process on a substrate passing through said plurality of chambers on a substrate tray;

tray identification means for reading out a number of identification marks which are provided on a substrate tray on which a substrate is passed through said plurality of chambers;

deformation measuring means for detecting a distance between the substrate tray and a standard position thereof and for measuring a deformation amount of the substrate tray;

counting means responsive to the read out number of identification marks for counting the number of times the substrate tray has passed through said plurality of chambers;

comparing means for comparing the measured deformation amount and a previously set deformation amount;

output means for outputting a signal when the counted number has reached a previously set number or when the measured deformation amount exceeds the previously set deformation amount;

stock means for stocking a number of available substrate trays; and tray exchange means responsive to the output signal for exchanging the substrate tray for an available substrate tray.

10. A control method for a substrate tray, comprising the steps of:

reading out an identification number on a substrate tray;

determining the number of times the substrate tray has been used;

measuring a deformation amount of the substrate tray; and removing the substrate tray from a transfer line when the number of times the substrate tray has been used exceeds a predetermined number of times and/or when the deformation amount exceeds a predetermined allowable deformation amount.

* * * * *